United States Patent Office 3,081,334
Patented Mar. 12, 1963

3,081,334
BICYCLO-[2.2.2]OCT-2-ENE-1,4-DICARBOXYLIC ACID, ITS PREPARATION AND FUNCTIONAL DERIVATIVES
James C. Kauer, Wilmington, Del., assignor to E. I. du Pont de Nemours and Company, Wilmington, Del., a corporation of Delaware
No Drawing. Filed May 16, 1960, Ser. No. 29,169
11 Claims. (Cl. 260—468)

This invention relates to new organic compounds containing a bridged ring system. More particularly, it relates to bicyclo compounds having reactive substituents at the bridgeheads and intracyclic unsaturation, and to a process of preparing these compounds.

The new products of this invention are bicyclo-[2.2.2]oct-2-ene-1,4-dicarboxylic acid, its esters, amides and acid halides. Otherwise stated, these products are bicyclo[2.2.2]oct-2-enes having substituents in the 1- and 4-positions, said substituents being non-oxo-carbonylic groups having a single non-oxo-carbonyl; that is, carboxy groups or monovalent, oxygen-containing groups hydrolyzable to a single carboxy group, i.e., ester amido or acid halide groups.

These products have the general formula

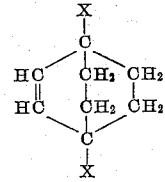

where X is carboxyl, —COOH; acyl halide (i.e., halocarbonyl, —CO—Hal.); ester (i.e., hydrocarbyloxycarbonyl, —COOR); or amide, i.e., carbamoyl, —CONH$_2$; N-hydrocarbylcarbamoyl, —CONHR; or N,N-dihydrocarbylcarbamoyl,

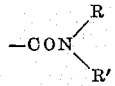

In these groups, Hal. represents a halogen, preferably chlorine, and R and R' represent hydrogen or hydrocarbon radicals, preferably of 1 to 12 carbon atoms and free from non-aromatic unsaturation. When R and R' are hydrogen, X is carbamoyl. The two R's, taken together, can form a divalent alkylene radical, i.e., they can form a ring, preferably of five to six members, with the nitrogen to which they are attached. Hydrocarbyl is defined as a monovalent hydrocarbon radical.

The products of this invention are prepared by maintaining in contact 2,3-dihydroterephthalic acid, or an ester, amide or acid halide thereof, i.e., a compound of the formula

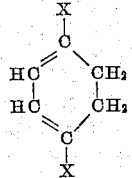

where X has the previously defined significance with ethylene at a pressure of at least 50 atmospheres and a temperature of at least 75° C. until the corresponding 1,4-disubstituted bicyclo[2.2.2]oct-2-ene has formed.

The reaction that takes place is a Diels-Alder condensation, whereby ethylene (the dienophile) adds to the conjugated system of the diene (the 2,3-dihydroterephthalic acid or derivative) at the 1- and 4-positions. It is represented by the equation:

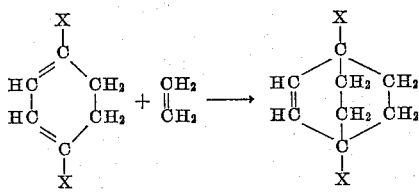

This reaction is believed to be the first example of a Diels-Alder addition of ethylene to a diene having electron-withdrawing groups attached to the conjugated system. That such a reaction would take place at all, and especially at the relatively low temperatures required, was entirely unexpected.

The process is conducted by heating ethylene and 2,3-dihydroterephthalic acid or an ester, amide or acyl halide thereof in a pressure-resistant vessel at a temperature of at least 75° C., and preferably in the range of 100–225° C., although higher temperatures, e.g., up to 300° C., can be used if desired. For practical conversions, the ethylene pressure within the system should be at least 50 atmospheres. It is desirably at least 100 atmospheres, the preferred pressure range being that between 500 and 3000 atmospheres. There is, of course, no critical upper pressure limit except the maximum that the equipment is able to withstand, and pressures as high as 5000 atmospheres or higher can be used. Most conveniently, the ethylene is introduced in the reaction vessel from an outside source at the required pressure which, if desired, can be maintained at a uniform level by continuous replacement of the ethylene consumed, although this is not necessary if sufficient ethylene is initially present in the reactor. However, part of the pressure can be supplied by an inert gas such as nitrogen, provided the partial pressure of ethylene is at least 50 atmospheres. The ethylene is used in at least equimolar amount with respect to the 2,3-dihydroterephthalic acid or derivative, and normally in excess thereover, which can be quite large.

A solvent or reaction medium is not necessary but can be used if desired, especially with high melting starting materials. Any inert organic liquid free of non-aromatic unsaturation and which is at least a partial solvent for the reactants is suitable, e.g., aromatic hydrocarbons and halohydrocarbons, aliphatic carboxylic acids, cyclic or acyclic ethers and the like. Agitation of the reaction vessel is preferred, although not essential.

Substantial conversions are normally achieved within about an hour at reaction temperature. It is usually unnecessary to prolong the reaction period beyond 8–16 hours. The reaction product, which is usually a solid, is then isolated by any suitable conventional procedure such as distillation at reduced pressure, solvent extraction, crystallization and the like.

Specific examples of 1,4-disubstituted bicyclo-[2.2.2] oct-2-enes which are obtained, according to this invention, by reacting ethylene with the appropriate 2,3-dihydroterephthalic compound (acid, acid halide, ester or amide) include, among others, those in which the X substituent in the general formula given above is carboxy, —COOH; chlorocarbonyl, —COCl; bromocarbonyl, —COBr; methoxycarbonyl, —COOCH$_3$; ethoxycarbonyl, —COOC$_2$H$_5$; propoxycarbonyl, —COOC$_3$H$_7$;

sec.-butoxycarbonyl, —COOCH$\overset{\displaystyle CH_3}{\underset{\displaystyle C_2H_5}{}}$;

hexyloxycarbonyl, —COOC$_6$H$_{13}$;
decyloxycarbonyl, —COOC$_{10}$H$_{21}$;
dodecyloxycarbonyl, —COOC$_{12}$H$_{25}$;
cyclohexyloxycarbonyl, —COOC$_6$H$_{11}$;

phenoxycarbonyl, —COOC$_6$H$_5$;
p-toloxycarbonyl, —COOC$_6$H$_4$CH$_3$;
naphthoxycarbonyl, —COOC$_{10}$H$_7$;
benzyloxycarbonyl, —COOCH$_2$C$_6$H$_5$;
carbamoyl, —CONH$_2$;
N-methylcarbamoyl, —CONHCH$_3$;
N-octylcarbamoyl, —CONHC$_8$H$_{17}$;
N-dodecylcarbamoyl, —CONHC$_{12}$H$_{25}$;
N-cyclopentylcarbamoyl, —CONHC$_5$H$_9$;
N-phenylcarbamoyl, —CONHC$_6$H$_5$;
N-benzylcarbamoyl, —CONHCH$_2$C$_6$H$_5$;
N,N-diethylcarbamoyl, —CON(C$_2$H$_5$)$_2$;
N,N-dihexylcarbamoyl, —CON(C$_6$H$_{13}$)$_2$;

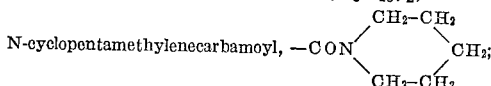

N-cyclopentamethylenecarbamoyl,

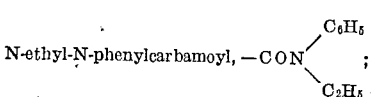

N-ethyl-N-phenylcarbamoyl, and

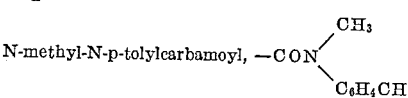

N-methyl-N-p-tolylcarbamoyl,

It will be understood, of course, that any desired product of this invention can be obtained either directly, i.e., by reacting ethylene with the appropriate 2,3-dihydroterephthalic compound, or indirectly, i.e., by converting a product of one chemical class (e.g., an ester) into a product of a different chemical class (e.g., an amide). Thus, for example, the free bicyclo[2.2.2]oct-2-ene-1,4-dicarboxylic acid can be converted by known methods to any desired ester, amide or acyl halide, and vice versa.

A distinguishing feature of the products of this invention lies in the fact that they possess reactive groups located in the 1- and 4-positions (para positions) of a six-membered ring. The special advantage of this structure is that products possessing it are uniquely adapted as starting materials in the synthesis of high melting, high viscosity linear condensation polymers, particularly of the polyamide type. As will be shown later, this advantage is lacking in isomeric products having reactive groups in adjacent (ortho) positions, such as bicyclo[2.2.2]oct-5-ene-2,3-dicarboxylic acid, whose dimethyl ester has been reported in the literature [Kohlrausch et al., Ber. 75B, 1385 (1942)].

Another distinguishing feature of the products of this invention is the presence of intracyclic unsaturation. Because of this unsaturation, linear condensation polymers derived from these bifunctional compounds are amenable to crosslinking reactions, for example, by treatment with sulfur or dithiols, conferring insolubility and chemical inertness to the treated polymers, e.g., those of the polyester type. The presence of unsaturation also permits the introduction of other reactive groups, such as halogen or mercapto groups, and thus the synthesis of many derivatives having special and useful properties.

The invention is illustrated in greater detail in the following examples.

*Example I*

In a silver-lined autoclave, 10 g. of dimethyl 2,3-dihydroterephthalate was heated with agitation at 165° C. for 16 hours under a pressure of 1000 atmospheres of ethylene, repressuring as needed until no further pressure drop was observed. There was obtained 6.75 g. of dimethyl bicyclo[2.2.2]oct-2-ene-1,4-dicarboxylate,

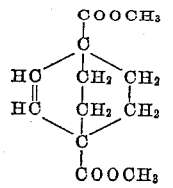

as a white solid which, upon recrystallization from ten times its weight of n-hexane, appeared as white crystals melting at 75–76° C. No unreacted dimethyl 2,3-dihydroterephthalate was present, the losses being only mechanical ones.

*Analysis.*—Calc'd for C$_{12}$H$_{16}$O$_4$: C, 64.28; H, 7.14; M.W., 224. Found: C, 64.50; H, 7.32; M.W., 227.

The identity of the product was confirmed by its infrared spectrum, which showed a peak at 1740 cm.$^{-1}$ characteristic of an unconjugated ester, and a peak at 1640 cm.$^{-1}$ characteristic of a double bond. The structure was further established by catalytic hydrogenation over platinum followed by hydrolysis with potassium hydroxide and acidification. The product resulting from this sequence of reactions was shown, by comparison of infrared spectra, to be identical with an authentic sample of bicyclo[2.2.2]octane-1,4-dicarboxylic acid prepared by the method described by Roberts, Moreland and Frazer in J. Am. Chem. Soc. 75, 637 (1953).

The starting material in this example, dimethyl 2,3-dihydroterephthalate, as well as the free acid, are known compounds which may be prepared by known methods. In this work, these compounds were prepared by the method of Guha and Hazra, J. Ind. Inst. Sci. 22A, 263, (1939).

*Example II*

When 16 g. of dimethyl 2,3-dihydroterephthalate was heated in an agitated autoclave at 135° C. for 14 hours under an approximately constant pressure of 3000 atmospheres of ethylene, there was obtained 13 g. of dimethyl bicyclo[2.2.2]oct-2-ene-1,4-dicarboxylate after recrystallization of the reaction product from methanol and hexane. The reaction was very rapid under these conditions, as judged from the absence of further pressure drops a short time after the start of the operation.

*Example III*

The procedure of Example I was repeated except that the ethylene was reacted with a solution of 46.2 g. of dimethyl 2,3-dihydroterephthalate in 75 ml. of benzene for 11 hours, other reaction conditions being the same. On evaporating the solvent, there was obtained 30.6 g. of dimethyl bicyclo[2.2.2]oct-2-ene-1,4-dicarboxylate.

*Example IV*

Benzene solutions of dimethyl 2,3-dihydroterephthalate were heated in agitated autoclaves at 165° C. with ethylene under pressures of 68 and 340 atmospheres, respectively, for 14 hours. Dimethyl bicyclo[2.2.2]oct-2-ene-1,4-dicarboxylate was formed in each case, as shown by the infrared spectra of the reaction products, but the conversions were lower than in Example III, and some unreacted starting material was present in the reaction products.

*Example V*

A mixture of 20 g. of 2,3-dihydroterephthalic acid and 40 ml. of glacial acetic acid was heated for 14 hours at 200° C. in an agitated silver-lined autoclave with ethylene under a pressure of 3000 atmospheres, repressuring as needed. The solid reaction product was separated by filtration and washed with cyclohexane, then with 96% alcohol. After drying, the solid was stirred with 200 ml. of a 5% aqueous sodium carbonate solution to which 50 ml. of methanol had been added. The resulting mixture was filtered, and the filtrate was acidified to give 8.1 g. of bicyclo[2.2.2]oct-2-ene-1,4-dicarboxylic acid

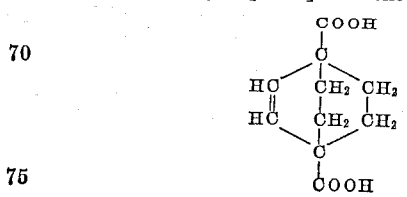

as white crystals melting at 365° C. with decomposition after recrystallization from acetic acid.

*Analysis.*—Calc'd for $C_{10}H_{12}O_4$: C, 61.22; H, 6.12; neutr. eq., 97. Found: C, 60.90; H, 6.60; neutr. eq., 95.

A portion of this acid was converted to the corresponding dicarboxylic acid chloride by treatment with phosphorus pentachloride. Treatment of portions of bicyclo[2.2.2]oct-2-ene-1,4-dicarboxylic acid chloride with methanol, ammonia gas, and benzylamine yielded, respectively, the dimethyl ester (identical with the product of Example I), the dicarboxamide,

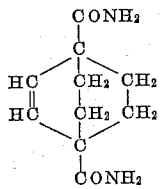

M.P. 325° C. (dec.) and the dibenzylamide,

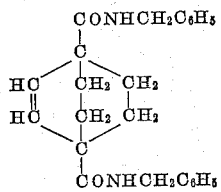

M.P. 203–205° C.

Example VI

Ten grams of 2,3-dihydroterephthaloyl chloride (prepared by reaction of 2,3-dihydroterephthalic acid with thionyl chloride) was heated for 14 hours at 150° C. in an agitated corrosion-resistant autoclave with ethylene under a pressure of 1000 atmospheres. The resulting solid reaction product was bicyclo[2.2.2]oct-2-ene-1,4-dicarboxylic acid chloride, which was characterized by conversion to dimethyl bicyclo[2.2.2]oct-2-ene-1,4-dicarboxylate by treatment with methanol, and by conversion to bicyclo[2.2.2]oct-2-ene-1,4-dicarboxamide by treatment with anhydrous ammonia gas. The identity of these products with the diester and the dicarboxamide of the preceding examples was established by infrared spectroscopy.

Example VII

A mixture of 4 g. of N,N'-dibenzyl-2,3-dihydroterephthalamide (prepared from 2,3-dihydroterephthaloyl chloride and benzylamine) and 25 g. of benzene was heated in an agitated autoclave at 180° C. for 14 hours under a pressure of 2500 atmospheres of ethylene. The reaction product (3.8 g.) was recrystallized from methanol to yield white crystals, M.P. 202–204° C., of 1,4-di(N-benzylcarbamoyl)bicyclo[2.2.2]oct-2-ene.

*Analysis.*—Calc'd for $C_{24}H_{26}N_2O_2$: C, 77.0; H, 6.95; N, 7.49. Found: C, 77.10; H, 7.38; N, 7.41.

This material was shown by infrared spectroscopy to be identical with that obtained from bicyclo[2.2.2]oct-2-ene-1,4-dicarboxylic acid chloride and benzylamine as described in Example V.

The 1,4-disubstituted bicyclo[2.2.2]oct-2-enes made available by this invention are useful in a wide variety of technical applications, among which the following may be mentioned.

The neutral products (esters or amides) are useful as plasticizers for natural or synthetic polymers, particularly those of the ester type such as cellulose acetate, polyvinyl acetate, polymethyl methacrylate and the like.

The acidic products are readily convertible to ammonium or metal salts (e.g., aluminum, nickel, cobalt, copper, manganese or lead salts) for use in textile treatment, as soap ingredient, pigment ingredients and accelerators for the curing of air-drying resins.

The dibasic acid is useful as starting material in the synthesis of alkyd-type resins with polyhydric alcohols such as glycerol. For example, by heating with glycerol, there is obtained a viscous liquid which, when cast onto steel plates and baked at 200° C., gives a hard, glossy film having good adhesion to the metal.

The dibasic acid (or its amide-forming derivatives, i.e., esters or acid halides) is highly suitable as starting materials for the preparation of technically valuable polyamides. In this use, it is totally different from, and vastly superior to its isomer, bicyclo[2.2.2]-oct-5-ene-2,3-dicarboxylic acid. This sharp distinction was demonstrated by the following comparative tests.

The isomeric acids, bicyclo[2.2.2]oct-2-ene-1,4-dicarboxylic acid (A) and bicyclo[2.2.2]oct-5-ene-2,3-dicarboxylic acid (B) were reacted with hexamethylenediamine under polyamide-forming conditions as follows: Each of two glass tubes was charged with stoichiometrically equivalent quantities of hexamethylenediamine and (A) and (B), respectively. The tubes were sealed and heated for 60 minutes at 295° C. to form the salts and begin the amidation, after which the tubes were opened and heated in a vapor bath at 286° C. for 90 minutes under one atmosphere of nitrogen while the water formed in the amidation reaction was allowed to distill out.

Under these conditions, the product from acid (A) was a white solid polymer, M.P. 290° C., having an inherent viscosity of 1.51 and containing 62.8 equivalents of amine ends and 72.6 equivalents of carboxyl ends per $10^6$ g., whereas the product from acid (B) was a slightly green, viscous oil with an inherent viscosity of 0.06 and containing 2748 equivalents of amine ends and 58 equivalents of carboxyl ends per $10^6$ g.

The first product was a polyamide entirely suitable for the production of cold-drawable filaments and films. The second product was wholly unsuitable for such uses. The disparity in amine and carboxyl ends in this product is indicative of the formation of end groups of the imide type, i.e., of chain termination through the reaction of two carboxyl groups with one amine group.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

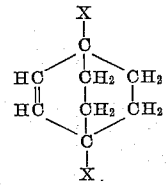

where X is a member of the group consisting of $CO_2H$, $CO_2R$, $CONH_2$, $CONHR$, $CONRR'$, chlorocarbonyl, and bromocarbonyl, where R and R' taken separately are hydrocarbyl radicals of one to twelve carbon atoms in which any unsaturation present is aromatic, and where R and R' taken together are a divalent alkylene radical which forms a ring of five to six members with the nitrogen to which it is attached.

2. Bicyclo[2.2.2]oct-2-ene-1,4-dicarboxylic acid.

3. A compound of the formula

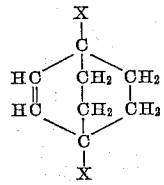

where X is $CO_2R$ and R is a hydrocarbyl radical of one to twelve carbon atoms in which any unsaturation present is aromatic.

4. Dimethyl bicyclo-[2.2.2]oct-2-ene-1,4 dicarboxylate.

5. A compound of the formula

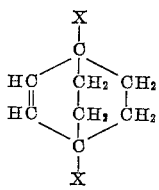

where X is CONHR' and R' is a hydrocarbyl radical of one to twelve carbon atoms in which any unsaturation present is aromatic.

6. Bicyclo[2.2.2]oct-2-ene-1,4-dicarboxamide.

7. 1,4-Di(N-benzylcarbamoyl)bicyclo[2.2.2]oct-2-ene.

8. A compound of the formula

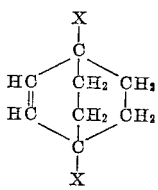

where X is CONRR' where R and R' taken separately are hydrocarbyl radicals of one to twelve carbon atoms in which any unsaturation present is aromatic, and where R and R' taken together are a divalent alkylene radical which forms a ring of five to six members with the nitrogen to which it is attached.

9. Bicyclo[2.2.2]oct-2-ene-1,4-dicarboxylic acid chloride.

10. Process for the preparation of compounds having the formula

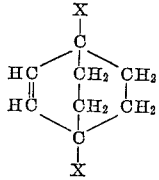

where X is a member of the group consisting of $CO_2H$, $CO_2R$, $CONH_2$, CONHR, CONRR', chlorocarbonyl, and bromocarbonyl, where R and R' taken separately are hydrocarbyl radicals of one to twelve carbon atoms in which any unsaturation present is aromatic, and where R and R' taken together are a divalent alkylene radical which forms a ring of five to six members with the nitrogen to which it is attached, which comprises contacting and reacting a compound of the formula

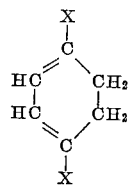

where X is as defined above, with ethylene at a pressure of at least 50 atmospheres and a temperature of at least 75° C.

11. Process for the preparation of compounds having the formula

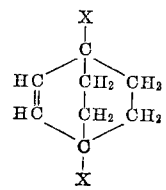

where X is a member of the group consisting of $CO_2H$, $CO_2R$, $CONH_2$, CONHR, CONRR', chlorocarbonyl, and bromocarbonyl, where R and R' taken separately are hydrocarbyl radicals of one to twelve carbon atoms in which any unsaturation present is aromatic, and where R and R' taken together are a divalent alkylene radical which forms a ring of five to six members with the nitrogen to which it is attached which comprises contacting and reacting a compound of the formula

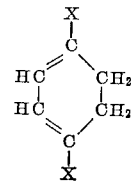

where X is as defined above, with ethylene at a pressure of at least 100 atmospheres and a temperature in the range of 100–225° C.

References Cited in the file of this patent

UNITED STATES PATENTS 2,352,606  Alder et al. _____ July 4, 1944

FOREIGN PATENTS 747,970  Great Britain _____ June 30, 1953

OTHER REFERENCES

Joshel et al.: Chemical Abstracts, vol. 36, p. 1036 (1942).

Nudenberg et al.: Chemical Abstracts, vol. 38, p. 1477 (1944).